(12) United States Patent  
Koellisch

(10) Patent No.: US 6,829,961 B2
(45) Date of Patent: Dec. 14, 2004

(54) INTERMEDIATE STEERING COLUMN

(75) Inventor: David Koellisch, Layfayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/973,201

(22) Filed: Oct. 9, 2001

(65) Prior Publication Data

US 2003/0066374 A1 Apr. 10, 2003

(51) Int. Cl.$^7$ ................................................ B62D 1/16
(52) U.S. Cl. ........................... 74/492; 74/504; 74/593; 280/777
(58) Field of Search ................... 74/492, 493, 504, 74/510, 511 R, 579 R, 586, 593; 280/777; 403/83, 306, 376, 377, 378, 408.1

(56) References Cited

U.S. PATENT DOCUMENTS

| | | | |
|---|---|---|---|
| 2,865,222 A | | 12/1958 | Bachman ................... 74/493 |
| 4,282,641 A | | 8/1981 | Phillips ................... 29/416 |
| 4,833,936 A | | 5/1989 | Mariani et al. ............ 74/493 |
| 4,946,195 A | | 8/1990 | Ioka et al. ............... 280/777 |
| 5,052,240 A | | 10/1991 | Miyoshi et al. ............ 74/493 |
| 5,090,730 A | * | 2/1992 | DuRocher et al. ......... 280/775 |
| 5,240,284 A | * | 8/1993 | Takada et al. ........... 280/775 |
| 5,501,288 A | * | 3/1996 | Ducote .................. 180/24.01 |
| 5,580,314 A | | 12/1996 | Moriyama et al. ......... 464/162 |
| 5,732,600 A | * | 3/1998 | Peterson et al. ........... 74/492 |
| 6,105,456 A | * | 8/2000 | Higashino et al. .......... 464/113 |
| 6,164,698 A | | 12/2000 | Gotoh ................... 280/771 |
| 2001/0020782 A1 | * | 9/2001 | Fosse et al. ............. 280/771 |

FOREIGN PATENT DOCUMENTS

| JP | 410258694 A1 | * | 9/1998 |
|---|---|---|---|
| JP | 2000016304 | * | 1/2000 |

* cited by examiner

Primary Examiner—David A. Bucci
Assistant Examiner—Julie K. Smith
(74) Attorney, Agent, or Firm—Tarolli, Sundheim, Covell & Tummino L.L.P.

(57) ABSTRACT

An intermediate steering column (10) for a vehicle with a firewall (14) includes a first shaft (30) pivotally attached to a first U-joint (54) and rotatable about a longitudinal axis (32) of the first shaft upon rotation of the first U-joint. A second shaft (28) drivingly connected to the first shaft (30) has a slip joint connection (42) with the first shaft permitting relative axial movement of the first and second shafts while maintaining a rotary drive connection between the first and second shafts. The first shaft (30) includes first and second shaft parts (60 and 62) and a quick disconnect joint (64) between the first and second shaft parts permitting disconnection of the first and second shaft parts and pivoting of the first shaft part relative to the first U-joint (54) to a first out of the way position and pivoting of the second shaft part relative to a second U-joint (36) to a second out of the way position.

10 Claims, 1 Drawing Sheet

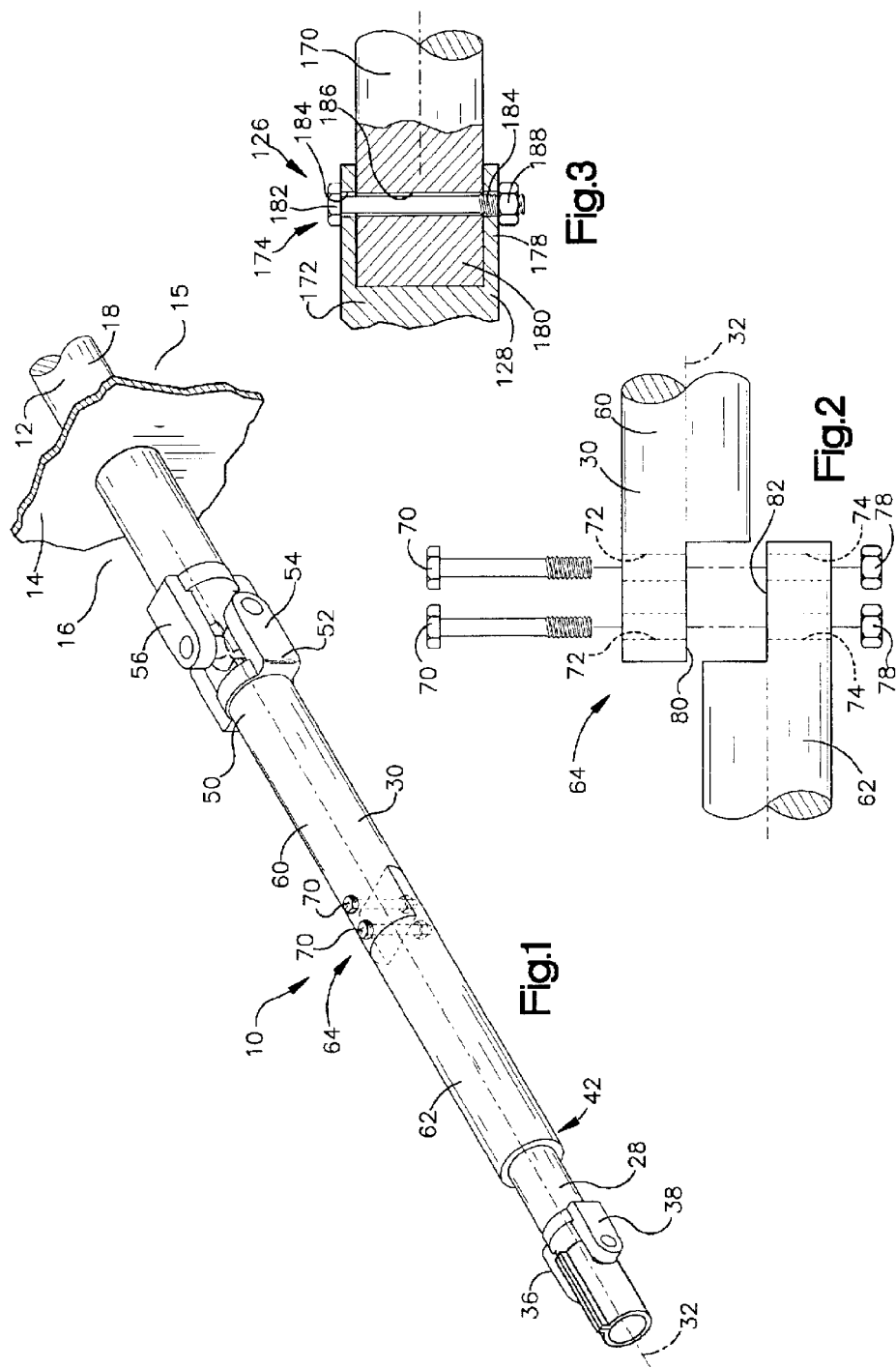

INTERMEDIATE STEERING COLUMN

TECHNICAL FIELD

The present invention relates to an intermediate steering column for a vehicle.

BACKGROUND OF THE INVENTION

An intermediate steering column of a vehicle is connected with a steering wheel and a steering mechanism. Upon rotation of the steering wheel, the intermediate steering column rotates to actuate the steering mechanism. The steering mechanism turns steerable wheels of the vehicle when actuated.

The intermediate steering column includes first and second shafts which are axially movable relative to each other. The first shaft is connected with the steering wheel by a first U-joint. The second shaft is connected with the steering mechanism by a second U-joint to actuate the steering mechanism upon rotation of the second shaft. The intermediate steering column extends through the engine compartment on a side of a firewall of the vehicle opposite from a passenger compartment. Accordingly, the intermediate steering column can be in the way when the engine is being worked on.

SUMMARY OF THE INVENTION

The present invention is an intermediate steering column for a vehicle having a firewall. The intermediate steering column includes a first U-joint connectable with a steering wheel of the vehicle. A first shaft is pivotally attached to the first U-joint and rotatable about a longitudinal axis of the first shaft upon rotation of the first U-joint. A second shaft is drivingly connected to the first shaft and has a slip joint connection with the first shaft permitting relative axial movement of the first and second shafts while maintaining a rotary drive connection between the first and second shafts. A second U-joint is pivotally attached to the second shaft and connectable with a steering mechanism of the vehicle.

The first shaft includes first and second shaft parts. The first shaft also includes a quick disconnect joint between the first and second shaft parts permitting disconnection of the first and second shaft parts. The first and second shaft parts can be quickly disconnected to permit pivoting of the first shaft part relative to the first U-joint to a first out of the way position and pivoting of the second shaft part relative to the second U-joint to a second out of the way position. Accordingly, the shafts of the intermediate steering column can be quickly disconnected and moved to out of the way positions to permit easy access to the engine compartment of the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic pictorial view of an intermediate steering column constructed in accordance with a first embodiment of the present invention;

FIG. 2 is a schematic side view of a portion of the intermediate steering column of FIG. 1; and FIG. 3 is a schematic sectional view of a portion of an intermediate steering column constructed in accordance with a second embodiment of the invention.

DESCRIPTION OF THE INVENTION

The present invention relates to an intermediate steering column for use in a steering system for turning steerable wheels of a vehicle. As representative of the present invention, FIG. 1 illustrates an intermediate steering column 10. The intermediate steering column 10 turns steerable wheels (not shown) upon rotation of a steering wheel (not shown) by a driver of the vehicle.

An upper steering column 12 is connected with the steering wheel (not shown) and rotates with the steering wheel. The upper steering column 12 extends through a firewall 14 that separates a passenger compartment 15 and an engine compartment 16 of the vehicle, as known in the art. The upper steering column 12 could include a pair of steering column members which are axially movable relative to each other. The upper steering column 12 has at least one steering column member 18 which is connected with the intermediate steering column 10. The intermediate steering column 10 includes first and second shafts 28 and 30 which are axially movable relative to each other. The shafts 28 and 30 rotate together about a common axis 32 of the shafts 28 and 30.

One end of the shaft 28 is connected with a steering mechanism (not shown). The steering mechanism may have any construction known in the art. The steering mechanism, when actuated, turns the steerable wheels (not shown) of the vehicle as is known in the art.

The steering mechanism is connected to a U-joint 36. A yoke 38 of the U-joint 36 is connected to the shaft 28. The shaft 28 can pivot relative to the steering mechanism and the U-joint 36 about a pivot axis extending transverse to the axis 32 of the shaft 28. When the shaft 28 rotates, the steering mechanism is actuated to turn the steerable vehicle wheels. The shaft 28 extends into a tubular shaft part of the shaft 30. The shaft 28 rotates upon rotation of the shaft 30 about the axis 32.

The shaft 30 is drivingly connected to the shaft 28 and has a slip joint connection 42 with the shaft 28. The slip joint connection 42 permits relative axial movement of the shafts 28 and 30 while maintaining a rotary drive connection between the shafts. The slip joint connection 42 may have any construction known in the art.

An axial end portion 50 of the shaft 30 is connected to a yoke 52 of a U-joint 54. Another yoke 56 of the U-joint 54 is connected to the column member 18 of the upper steering column 12. The shaft 30 can pivot, relative to the U-joint 54 about a pivot axis extending transverse to the axis 32 of the shaft 30. When the column member 18 rotates, the shaft 30 and the shaft 28 rotate about the common axis 32. Although the U-joint 54 is shown in the engine compartment 16 on a side of the firewall 14 opposite from the passenger compartment 15, it is contemplated that the U-joint could be located on a side of the firewall opposite the engine compartment with the shaft 30 extending through the firewall.

When the steering wheel rotates, the upper steering column 12 rotates. Rotation of the upper steering column 12 causes rotation of the intermediate steering column 10. Rotation of the intermediate steering column 10 actuates the steering mechanism to turn the steerable vehicle wheels.

The shaft 30 includes first and second shaft parts 60 and 62 interconnected by a quick disconnect joint 64. The quick disconnect joint 64 permits quick disconnection of the first and second shaft parts 60 and 62. When the shaft parts 60 and 62 are disconnected from each other, the first shaft part 60 can pivot relative to the U-joint 54 to a first out of the way position and the shaft part 62 along with the shaft 28 can pivot relative to the U-joint 36 to a second out of the way position. When the shaft parts 60 and 62 are pivoted to the out of the way positions, the engine compartment 16 of the vehicle can be easily accessed.

The quick disconnect joint 64 (FIG. 2) includes a pair of bolts 70 extending through openings 72 in the first shaft part 60. The bolts 70 also extend through openings 74 in the second shaft part 62. Nuts 78 threadably engage the bolts 70 to connect the shaft parts 60 and 62 together.

The shaft part 60 has a surface 80 extending parallel to the longitudinal axis 32 of the shaft part 60 that engages a surface 82 on the second shaft part 62. The surface 82 on the second shaft part extends parallel to the surface 80 on the first shaft part 60. Accordingly, the shaft parts 60 and 62 can be quickly disconnected from each other by removing the bolts 70 to permit pivoting of the shaft parts relative to the U-joints 54 and 36 so that the engine in the engine compartment can be easily reached.

An intermediate steering column 126 constructed according to a second embodiment of the present invention is illustrated in FIG. 3. The intermediate steering column 126 illustrated in FIG. 3 is generally similar to the intermediate steering column 10 illustrated in FIGS. 1-2 with a different quick disconnect joint between the first and second shaft parts. Accordingly, only the quick disconnect joint will be described in detail.

A first shaft 128 of the intermediate steering column 126 includes first and second shaft parts 170 and 172 and a quick disconnect joint 174 between the first and second shaft parts. The quick disconnect joint 174 permits disconnection of the first and second shaft parts 170 and 172. When the first and second shaft parts 170 and 172 are disconnected, the first shaft part can pivot relative to a first U-joint to a first out of the way position and the second shaft part along with another shaft connected with a steering mechanism can pivot relative to a second U-joint to a second out of the way position.

The second shaft part 172 includes a tubular end 178 into which an end 180 of the first shaft part 170 extends. A bolt 182 expends through openings 184 in the tubular end 178 of the second shaft part 172 and through an opening 186 in the end 180 of the first shaft part 170. A nut 188 threadably engages the bolt 182 to connect the first and second shaft parts 170 and 172 together. Accordingly, the shaft parts 170 and 172 can be quickly disconnected by removing the bolt 182 to permit pivoting of the first shaft part relative to the first U-joint and pivoting of the second shaft part relative to the second U-joint.

From the above description of the invention, those skilled in the art will perceive improvements, changes and modifications. Such improvements, changes and modifications within the skill of the art are intended to be covered by the appended claims.

Having described the invention, the following is claimed:

1. An intermediate steering column for a vehicle having a firewall, said intermediate steering column comprising:

a first U-joint connectable with a steering wheel of the vehicle;

a first shaft pivotally attached to said first U-joint and rotatable about a longitudinal axis of said first shaft upon rotation of said first U-joint;

a second shaft drivingly connected to said first shaft and having a slip joint connection with said first shaft permitting relative axial movement of said first and second shafts while maintaining a rotary drive connection between said first and second shafts;

a second U-joint pivotally attached to said second shaft and connectable with a steering mechanism of the vehicle; and said first shaft comprising first and second shaft parts and a reusable quick disconnect joint between said first and second shaft parts permitting disconnection of said first and second shaft parts without relative axial movement between said first and second shaft parts and pivoting of said first shaft part relative to said first U-joint to a first out of the way position and pivoting of said second shaft and said second shaft part relative to said second U-joint to a second out of the way position without relative axial movement between said first and second shaft parts and then further permitting reconnection of said first and second shaft parts by said quick disconnect joint, said quick disconnect joint including a fastener extending through both said first shaft part and said second shaft part of said first shaft.

2. An intermediate steering column as defined in claim 1 wherein said first shaft part includes a first surface extending parallel to said longitudinal axis of said first shaft part engageable with a second surface on said second shaft part extending parallel to said first surface.

3. An intermediate steering column as defined in claim 2 wherein said quick disconnect joint includes a fastener extending through said first and second surfaces.

4. An intermediate steering column as defined in claim 1 wherein said second shaft part includes a tubular end into which said first shaft part extends.

5. An intermediate steering column as defined in claim 4 wherein said quick disconnect joint includes a fastener extending through said tubular end of said second shaft part and said first shaft part located within said tubular end.

6. An intermediate steering column as defined in claim 1 wherein said quick disconnect joint includes a bolt extending through said first and second shaft parts and a nut threadably engaging said bolt.

7. An intermediate steering column as defined in claim 6 further including a second bolt extending through said first and second shaft parts and a second nut threadably engaging said second bolt.

8. An intermediate steering column as defined in claim 1 wherein said first U-joint is located at least in part on a side of a firewall opposite a passenger compartment of the vehicle, said first shaft being for location at least in part on the side of the firewall opposite the passenger compartment.

9. An intermediate steering column as defined in claim 1 wherein said fastener is releasable and, when released, permits disconnection of said first and second shaft parts, said releasable fastener being operable to reconnect said first and second shaft parts.

10. An intermediate steering column as defined in claim 1 wherein said quick disconnect joint is not destroyed during disconnection.

* * * * *